United States Patent [19]
Burnett et al.

[11] Patent Number: 5,966,524
[45] Date of Patent: Oct. 12, 1999

[54] 3-D ELECTROMAGNETIC INFINITE ELEMENT

[75] Inventors: David Storer Burnett, Roxbury; Frank Michael Labianca, Cedar Knolls, both of N.J.

[73] Assignee: Lucent Technologies Inc., Murray Hill, N.J.

[21] Appl. No.: 08/939,456

[22] Filed: Sep. 29, 1997

Related U.S. Application Data

[60] Provisional application No. 60/053,630, Jul. 24, 1997.

[51] Int. Cl.$^6$ .............................. G06G 7/48; G06F 17/16
[52] U.S. Cl. ............................... 395/500.26; 395/500.24
[58] Field of Search ...................... 364/578; 395/500.26

[56] References Cited

U.S. PATENT DOCUMENTS

| 5,604,891 | 2/1997 | Burnett et al. | ........................... 395/500 |
| 5,604,893 | 2/1997 | Burnett et al. | ........................... 395/500 |

OTHER PUBLICATIONS

S. Gratkowski et al., "On the accuracy of a 3–D infinite element for open boundary electromagnetic field analysis" *Archiv Fur Elektrotechnik*, vol. 77, No. 2, pp. 77–83, (1994).

D. S. Burnett, "A Three–Dimensional Acoustic Infinite Element Based on a Prolate Spheroidal Multipole Expansion," *J. Acoust. Soc. Am.* 96 (1994) 2798–2816.

U.S. Patent Application Serial No. 08/812,472.

L. B. Felsen and N. Marcuvitz, Radiation and Scattering of Waves, IEEE Press, 1994, Sections 2.5 and 2.6.

Lowther et al.: A Sparse Matrix Open Boundary Method for Finite Element Analysis; IEEE Trans. Mag., pp. 2810–2812, 1989.

Hernandez–Figueroa et al.: Finite Element Approach for the Modal Analysis of Open–Boundary Waveguides; IEEE: Electronics Letters, pp. 2031–2032, 1994.

*Primary Examiner*—Kevin J. Teska
*Assistant Examiner*—Hugh Jones
*Attorney, Agent, or Firm*—Martin I. Finston

[57] ABSTRACT

An ellipsoidal infinite element is used for the modeling of electromagnetic fields in exterior domains surrounding a structure. This infinite element is based on a multipole expansion that describes scattered and/or radiated fields exterior to the structure. The electromagnetic field is represented in the exterior domain by a pair of scalar potentials, referred to as the Debye potentials.

13 Claims, 6 Drawing Sheets

3-D ELECTROMAGNETIC INFINITE ELEMENT

This application claims the benefit of U.S. Provisional Application No. 60/053630, filed Jul. 24, 1997.

BACKGROUND OF THE INVENTION

In many of the predictive and analytical problems of theoretical and applied engineering, it is necessary to solve one or more of the equations of physics that describe a physical field. The field variable that is sought may be, for example, a measure of mechanical deformation, acoustic pressure, an electrostatic or electromagnetic potential, or an electromagnetic field intensity.

The equations that describe these and other fields are differential equations, integral equations, or equations that combine aspects of both, which can be solved exactly, if at all, only by the techniques of calculus. Typically, boundary conditions (and also initial conditions, if time evolution is part of the problem to be solved) must be specified in order to provide a complete definition of the problem that is to be solved. In practical situations, these boundary conditions often involve specifying the field variable, its derivatives, functions of either or both of these, or a combination of some or all of the preceding, on complicated two- or three-dimensional surfaces. As a consequence of the complexity of both the governing physical equations and the boundary conditions, most practical problems are too complex to solve by hand calculations.

Numerical modeling techniques are aimed at providing approximate solutions to these equations that can be performed with the help of a digital computer. Many different numerical modeling techniques are available. One such technique, which has proven extremely fruitful in numerous fields of application, is the so-called finite element method (FEM).

As we describe more fully hereafter, the traditional practice of the FEM calls for the spatial region of interest to be subdivided into a plurality of perfectly juxtaposed cells (i.e., cells that are juxtaposed without overlaps or interstitial voids), which are referred to as elements. Discrete nodes are defined on the inter-element boundaries and, typically, also within the element interiors. The network of elements and nodes is referred to as a mesh.

The FEM does not seek an exact solution to the physical field equation. Instead, it assumes that within each element, the field can be described, to an adequate approximation, by a finite linear combination of simple functions, such as polynomials, that are chosen, inter alia, for convenient analytical properties. The coefficients of the respective polynomials in such a linear combination are referred to as degrees of freedom (DOF). The polynomials are normalized in such a way that the DOF are equal to, or otherwise relate to, the values of the field variable at the nodes. Between the nodes, the polynomials interpolate the values of the field variable in a continuous fashion.

The polynomials themselves are known a priori. Therefore, the problem is solved, within a given element, by specifying the values of the DOF for that element. The DOF are not determined directly from the field equation. Instead, a mathematical condition is derived from the field equation. In essence, this condition demands that a certain measure of error (i.e., between the approximate and exact solutions) must be small. Once this condition has been fully defined, it can be expressed as a set of linear equations, in which the unknowns are the DOF. Linear equations are well-suited to be solved by a digital computer, because all that is required is a large number of repetitive, mechanical manipulations of stored quantities.

The linear equations belonging to a given element are not solved in isolation. Instead, the sets of equations belonging to all of the elements are assembled into a single matrix system. Suitable modifications are made to these system equations to account for the boundary conditions. Then the matrix system is solved automatically by standard methods.

Special challenges arise when attempting to obtain a mathematical solution, either exact or approximate, to any problem involving scattering and/or radiation, e.g., of acoustic or electromagnetic waves, from an object located in an unbounded region (that is, in open or free space). The mathematical solution to all such problems must satisfy a so-called "radiation condition" (often known as the Sommerfeld condition, or, in electromagnetism, in acoustics and as the Silver-Muller condition. The condition states that all waves "at infinity" are only traveling outward toward infinity, not inward from infinity. Thus, all the energy in the problem resides in the radiated or scattered waves, which are traveling outward after their interaction with the object; conversely, no energy is created at infinity. Note that the radiation condition is a condition that exists "at infinity," not at a finite distance. Much of the history of computational methods for such problems has been focused on how to obtain approximate, numerical solutions that satisfy the radiation condition to an acceptable accuracy, while not being prohibitively expensive.

We note that the FEM, because of its extraordinary versatility in handling objects of virtually any geometric shape and material properties, is generally the method of choice for modeling the finite part of the problem, i.e., the object and, sometimes, a finite part of the open region surrounding the object. (The Finite Difference Time Domain method is occasionally used for small problems.) The challenge is how to model the remainder of the infinite region, including the radiation condition at infinity. The methods have generally fallen into three classes.

The first class uses boundary integral equation methods (BIEM). Here, an integral equation that satisfies the radiation condition exactly can be applied directly on the outer surface of the object. Its advantage, which seems compelling at first sight, is that the infinite exterior domain is replaced, with no loss in physical approximation, by a (relatively) small surface, which greatly reduces the computational size of the problem. However, it has a severe disadvantage. The matrices in the resulting discretization of the integral equation are fully populated, making the computational cost prohibitively expensive except for only small-scale problems. (Small-scale means the dimensions of the object are small relative to the relevant wavelengths.)

The second class uses exact solutions to the wave equation in open regions, often expressed as infinite series of known functions, e.g., wave functions or multipoles. These are joined to the solutions in the finite region in a manner that approximately establishes continuity along, e.g., a closed boundary surrounding the object. This approach suffers from the same disadvantage as the BIEM, namely, that the resulting discretized equations are fully populated, hence prohibitively expensive.

The third class, which has comprised most of the research in recent years, is to construct an artificial boundary surrounding the object, then apply a so-called absorbing (or non-reflecting) boundary condition (ABC) that will make the boundary appear as transparent as possible to all outward traveling waves, i.e., the radiated or scattered fields. There have been many variations on this approach. The primary advantage here is that the resulting discretized equations have sparse matrices. This property, by itself, would keep the cost low. However, the disadvantage is that all ABCs, which are applied to a boundary at a finite distance, can only be approximations to the exact radiation condition at infinity. As a consequence, spurious (non-realistic) waves are reflected from the artificial boundary, which then propagate throughout the entire finite region, contaminating the solution everywhere. This effect can be mitigated by moving the artificial boundary farther away from the object, but this only increases the size of the finite region and hence the cost.

An alternative to these approaches is the use of so-called infinite elements, which are finite elements that cover a semi-infinite sector of space. (We note that the term "finite" in the name "finite element method" means non-infinitesimal; it does not mean non-infinite. It is therefore semantically correct to say "infinite finite element," as was done in the early 1970s, but it is now universally called an "infinite element."

Infinite elements have been used to great advantage to solve problems in acoustics. Such uses for infinite elements are described, for example, in the article by D. S. Burnett, "A Three-Dimensional Acoustic Infinite Element Based on a Prolate Spheroidal Multipole Expansion," *J. Acoust. Soc. Am.* 96 (1994) 2798–2816 (BURNETT 1994). Also pertinent in this regard are U.S. Pat. No. 5,604,891 and U.S. Pat. No. 5,604,893, both assigned to the assignee hereof. Also pertinent in this regard is the currently pending U.S. patent application Ser. No. 08/812,472, also assigned to the assignee hereof.

These acoustic infinite elements have been highly acclaimed by leaders in the academic community as well as by commercial code developers because they have exhibited both high accuracy and extraordinary speed of computation (over 400 times faster than other state-of-the-art methods).

To use these infinite elements, one constructs (similar to the third class of methods above) an artificial boundary surrounding the object. However, instead of using ABCs, one constructs a single layer of infinite elements around the entire artificial boundary. This single layer covers the entire infinite region outside the artificial boundary. Most important to the invention is the fact that because each element extends all the way to infinity, the essential radiation condition can now be applied exactly "at" infinity. This is primarily what accounts for the high accuracy of these infinite elements. This high accuracy, in turn, accounts for the extremely high computational speeds because the infinite elements can be placed extraordinarily close to the object (typically less than half a wavelength), resulting in a much smaller finite computational region (than required with ABCs). Below, we describe an electromagnetic infinite element. We are unaware of any prior use of infinite elements in electromagnetism.

A central challenge to developing an EM infinite element is related to the vector nature of EM fields (as opposed to the simpler scalar nature of acoustic fields). Thus, an EM field is characterized by two coupled vector fields, i.e., the electric field and the magnetic field. Although all the classical field theories permit the representation of (scalar or vector) fields as spatial derivatives of potential functions, in the case of EM the only known representation for general applications (i.e., inhomogeneous and/or anisotropic physical properties) involves a vector-valued potential function, known as the vector potential. The lack of a suitable scalar-valued potential has been a deterrent to the development of an EM infinite element.

SUMMARY OF THE INVENTION

In developing our new EM infinite element, we recognized that most practical EM radiation and scattering problems (e.g., wireless telecommunication, radar) are in the atmosphere (air), for which the EM properties are homogeneous and isotropic in the open regions surrounding objects. Infinite elements are only used in such open regions. For these regions there does exist (though apparently it is not generally well known) a representation of general EM fields in terms of two independent scalar potential functions, each of which must satisfy the acoustic wave equation and the acoustic (Sommerfeld) radiation condition. This is the key to our invention. It enables us to apply our previously developed (see BURNETT 1994) acoustic infinite elements, essentially unchanged, to the EM realm.

More specifically, our invention makes use of a pair of scalar EM potential functions II' and II", referred to as the Debye potentials. The electromagnetic field may be resolved into a TE component and a TM component, in which the radial direction is defined as the longitudinal direction. E" and H" are, respectively, the electric and magnetic field intensities of the TE field component, and E' and H' are the corresponding field intensities of the TM field component. The potential functions II' and II" are defined such that E' and H' are derived, via simple expressions, from II', and E" and H" are derived via similar expressions from II". A mathematical derivation of the Debye potentials II' and II" can be found in the book by L. B. Felsen and N. Marcuvitz, *Radiation and Scattering of Waves*, IEEE Press, 1994.

In addition to providing a new, electromagnetic infinite element, we have shown, for the first time, how substantial computational efficiencies can be achieved by partitioning the problem space into a finite region and an unbounded region that is homogeneous and isotropic. By taking full advantage of the simple physical description of the unbounded region, such a partitioning makes it possible, by FEM techniques, to provide accurate solutions at and beyond the bounding surface without introducing numerical artifacts that would otherwise contaminate the solution within the bounding surface.

In typical applications of our invention, the structure of interest is modeled by constructing a smooth, closed bounding surface about the structure. We have developed a detailed infinite element formulation assuming that this bounding surface is a sphere. However, we believe that this formulation can be extended to geometries in which the bounding surface is a more general surface, such as a spheroid or ellipsoid. It is advantageous for the bounding surface to closely circumscribe the structure. Preferably, the distance of closest approach between the bounding surface and the structure is less than about one-half wavelength of the electromagnetic field (at the oscillation frequency pertinent to the problem being calculated).

Within the bounding surface, FEM modeling is carried out using finite (but not infinite) elements. Numerous commercial application programs are available for carrying out modeling of that kind.

The entire unbounded region lying outside the bounding surface is modeled using the inventive infinite element. At the bounding surface, it will be possible to couple the two modeling techniques without discontinuities. This is desirable because discontinuities tend to generate, as a computational artifact, spurious numerical waves that contaminate the calculated solution.

Such a combination of modeling technologies is particularly advantageous because it offers significant improvements in both computational speed and accuracy. Because of higher speed, it is possible, in turn, to incorporate more realistic physical modeling, which will lead to solutions having greater fidelity to real-world phenomena.

Practical applications of the invention include modeling of interactions between a radiation source and a body. One such source-body system consists of a wireless communication device (as the radiation source) and a human body (or a portion thereof, such as a human head). One significant problem in this field is the prediction of the rate (often of interest is the rate per unit mass) at which thermal energy is deposited in living tissue as the result of absorption of electromagnetic radiation from the communication device. When using the inventive method to solve such a problem, the emissive device and the absorptive body may both be included within the bounding surface. Alternatively, the emissive device may be treated as a pure radiation source, and included within an infinite element, exterior to the bounding surface. We believe that the use of our invention will lead to greater accuracy in predicting doses, and dose rates, of absorbed energy.

Other exemplary source-body systems include electric power lines, antennas, wireless or wired communication devices, electronic circuits, and other sources of electromagnetic radiation, paired with electronic devices of various kinds whose proper operation might be impaired by excessive environmental electromagnetic interference. Such sensitive devices include communication devices, as well as heart pacemakers, hearing aids, and other medical devices. We believe that the use of our invention will lead to greater accuracy in modeling the fields external to the emissive devices, as well as greater accuracy in modeling the sensitivity patterns of the potentially impaired devices. Thus, we believe that the use of our invention will lead to greater accuracy in studies of the electromagnetic compatibility of such systems of devices.

The invention can also be applied in antenna design, for calculating the transmission patterns and sensitivity patterns of antennas and antenna arrays.

The invention can also be applied for predicting the scattering of electromagnetic waves from structures. Thus, it is useful for calculating radar signatures of objects. In addition, the invention is useful for predicting patterns of scattering of communication transmissions from structures. For this reason, it is useful for optimizing the siting, as well as the design, of communication antennas such as those associated with cellular base stations.

It should be noted in this regard that the invention will have at least some useful applications even in the indoor environment. We believe that even indoors, the infinite element will provide useful estimates of the scattered field around an object, provided sufficient clear space surrounds the object. Generally, a radius of about ten wavelengths around the object is believed to be sufficient for such purpose. For design of, e.g., indoor wireless systems, the infinite element technology is usefully coupled to a conventional design code such as a ray-tracing code.

OVERVIEW OF THE FINITE ELEMENT METHOD

The finite element method (FEM) is a method, performed with the help of a computer, for predicting the behavior of a physical system by obtaining numerical solutions to mathematical equations that describe the system and its loading conditions. The use of the FEM may be thought of as comprising three phases: preprocessing, solution, and post-processing. These phases are now discussed in further detail with reference to FIG. 1.

Figure 1:
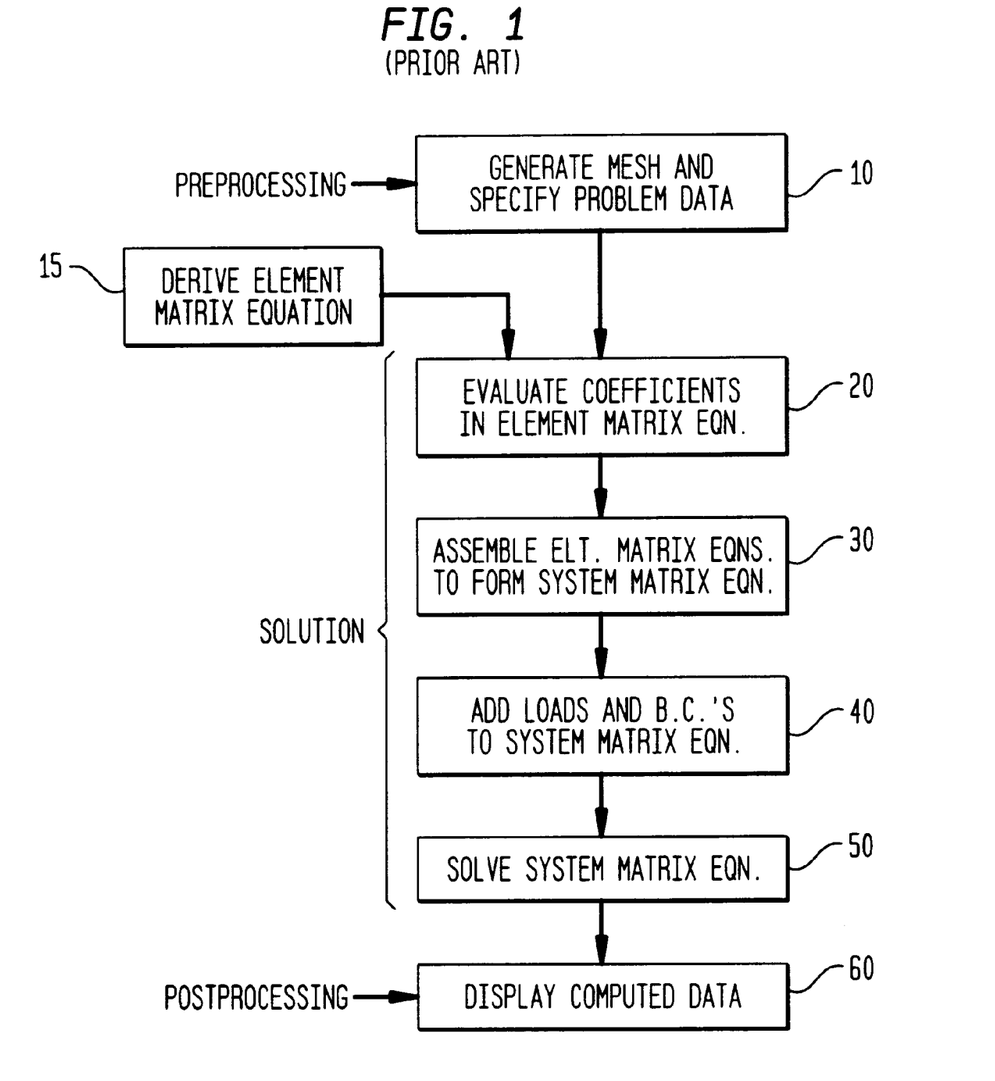
FIG. 1 is a flowchart illustrating the basic steps in the use and operation of a finite element code.

In the preprocessing phase, the physical domain of the problem is partitioned into a pattern of subdomains of simple geometry, referred to as "elements". The resulting pattern is referred to as a "mesh". In addition, problem data such as physical properties, loads, and boundary conditions are specified. This procedure is represented as step 10 of the figure.

The solution phase comprises steps 20–50 in the figure. In the first of these four steps, numerical values are computed for the coefficients in the "element matrix equation" associated with each element in the mesh. The element matrix equation, the derivation of which is indicated in box 15 of the figure, is a set of numerically computable mathematical formulas that are derived theoretically and implemented into the computer code that forms the FEM program.

During the use of the FEM program, the code for these formulas is accessed by each element in the mesh, and numerical values are computed for the coefficients in the formulas using the geometric and physical data associated with each element.

We are providing, for the first time, a set of such formulas (i.e., the element matrix equation) that is specific to an electromagnetic infinite element.

The procedure used in the derivation of the element matrix equation, which is described in detail below, embodies the following general ideas. The unknown field variable, for which the finite-element analysis is seeking a solution, is represented approximately within each element as a finite sum of known functions, referred to as "shape" functions. These shape functions are usually chosen to be polynomials. There are unknown parameters in this representation, referred to as "degrees of freedom (DOF)", that become the new unknowns which the finite-element analysis will find values for. The DOF are often the values that the unknown field variable takes at specific points in the element, referred to as "nodes". The purpose of this representation is that when values for the DOF are subsequently computed in step 50, a solution will then be known everywhere, continuously, throughout each element. This is possible because at that stage, both the shape functions and the parameters will be known, and these, together, define the complete solution.

The representation of the unknown field variable in terms of shape functions is then inserted into the governing physics equations (which are, typically, differential or integral equations) that express the physical laws to which the physical system is subject. These calculus equations reduce to a system of linear algebraic equations which, when written in matrx form, is the element matrix equation. The expressions for the coefficients in this matrix equation are manipulated using calculus and algebra until they are in a form that can be numerically evaluated by the computer. These numerical coefficients are the output of step 20.

In step 30, the element matrix equations from all the elements are combined together (i.e., they are said to be "assembled") into one large "system matrix equation." The matrices associated with elements that touch each other in the mesh will partially overlap, thereby establishing continuity in the field variable from element to element. Since the overlap is partial, the system matrix grows larger and larger as element equations are assembled, resulting in one very large system matrix.

The system matrix equation is then modified (step 40) to take account of the boundary and loading conditions. The system matrix equation is then solved (step 50), using conventional techniques of numerical analysis. Although there may be thousands, or even hundreds of thousands, of unknown DOF, the solution of this matrix equation is generally a very tractable problem. That is because the matrix elements tend to assume non-zero values only within a relatively narrow band along the matrix diagonal. A well-known measure of the width of this band (and thus, of the time required for solution) is the "rms half-bandwidth" $B_{rms}$.

In the postprocessing phase, the solution to the system matrix equation is displayed in an appropriate, meaningful form (step 60). In this phase, other useful information may be derived from the solution and likewise displayed. Below, we present a detailed description of the derivation of the element matrix equation for the inventive electromagnetic infinite element.

Structural finite element codes have a wide range of useful applications. By simulating the field in and around a structure and its interaction with the radiating structure, the design of the structure can be more quickly and efficiently modified (as compared to the current expensive, repeated prototyping procedures) to improve or optimize the radiative behavior, e.g., to reduce the overall radiation or to alter the directivity pattern. Important applications include reduction of environmental noise from electromagnetic interference from machinery, appliances, electronics, etc. Terminal equipment for telecommunications systems (speakerphones, loudspeakers, public phone booths, cellular phones, etc.) can be better designed to meet emissions standards. There are also military applications to radar and radar countermeasures.

APPARATUS FOR PRACTICING THE FINITE ELEMENT METHOD

Figure 2:
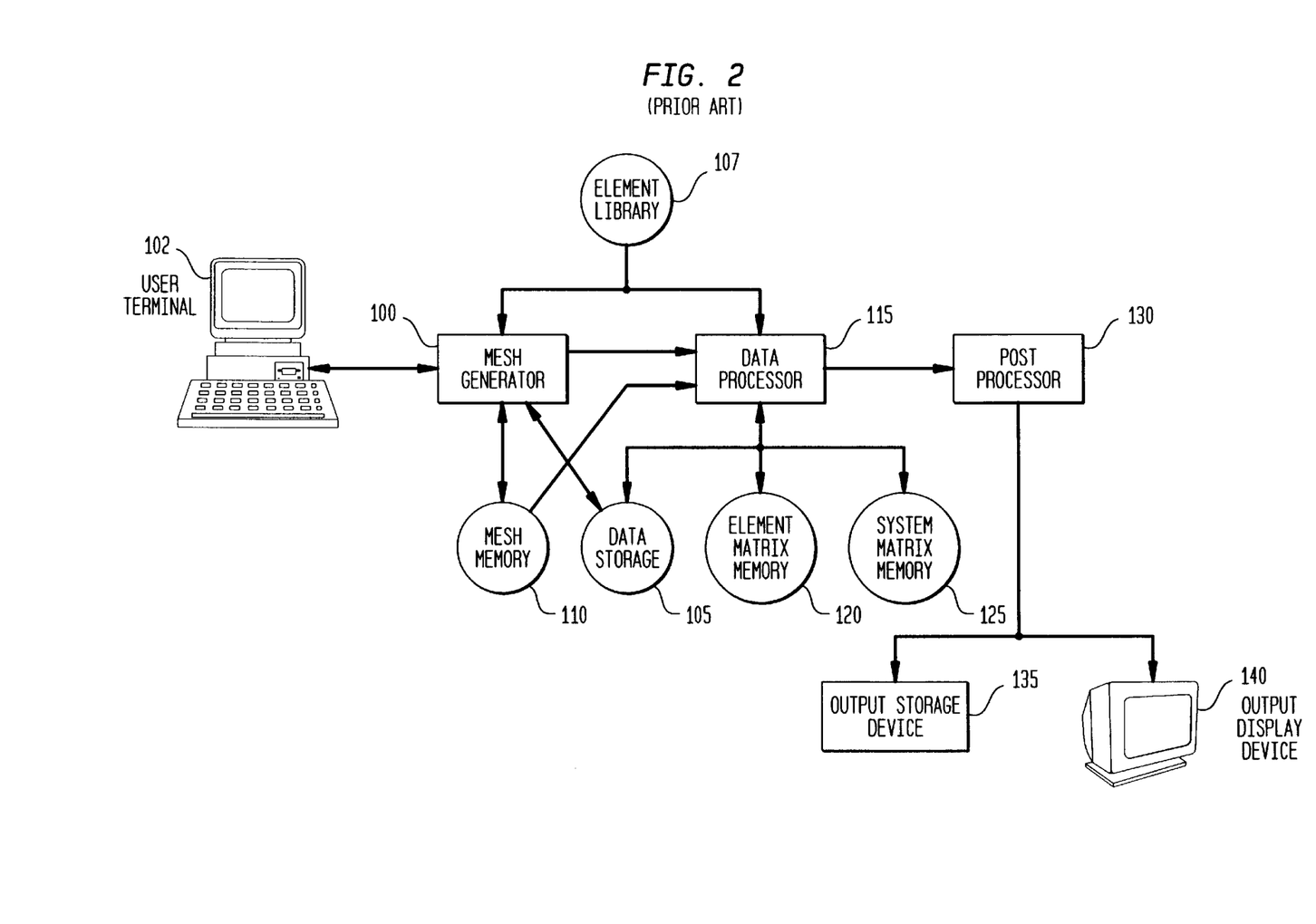
FIG. 2 is a block diagram of exemplary apparatus for practicing the finite element method.

With reference to FIG. 2, we now describe apparatus useful for practicing the FEM in general and our inventive method in particular.

A mesh generator 100 executes the preprocessing phase 10 of FIG. 1. It is common practice to use for the mesh generator, a programmed, general-purpose digital computer. Descriptions of the physical system to be modeled may be input to the mesh generator directly from a user terminal 102, or they may be input from a data storage device 105, such as a magnetic disk or a digital memory. The mesh generator will typically call upon a stored library 107 of elements (i.e., of nodal patterns arranged within sectors of triangular and/or quadrilateral cross-section). The mesh and other output data of the mesh generator are stored in memory device 110, which is typically a magnetic disk and also optionally a digital computer memory.

The solution phase (steps 20–50 of FIG. 1) is also typically carried out in a programmed computer, represented in the figure as element 115. As noted, an intermediate step of the solution phase is the evaluation of the coefficients of the element matrix equations. These coefficients are stored in a digital memory, denoted element 120 in the figure.

It is a general property of the solution phase that as the frequency increases, the computation time increases exponentially. For this reason, it will often be advantageous to use, for computer element 115, a parallel processor, such as a massively parallel processor or a scalable parallel processor.

In step 30 of FIG. 1, the element matrix coefficients are assembled into a system matrix equation. The memory element for storing the system matrix coefficients is denoted element 125 in FIG. 2.

The result of the solution phase is a description of the values assumed by a field variable throughout the mesh. This information is typically subjected to post-processing in a processing element denoted 130 in the figure, and output to a storage device 135 or display device 140.

DETAILED DESCRIPTION

Electromagnetic Field Quantities

The electromagnetic field quantities are listed below:

| Quantity | Symbol | SI units |
| --- | --- | --- |
| Electric field intensity | E = E (x, t) | V/m |
| Electric flux density | D = D (x, t) | $C/m^2$ |
| Magnetic field intensity | H = H (x, t) | A/m |
| Magnetic flux density | B = B (x, t) | $Wb/m^2$ |
| Current density | J = J (x, t) | $A/m^2$ |
| Volume charge density | $\rho = \rho$ (x, t) | $C/m^3$ |

The field quantities are related by the following constitutive laws for a simple medium:

electrical permittivity:

$$D = \epsilon E$$

magnetic permeability:

$$B = \mu H$$

electrical conductivity (Ohm's law):

$$J = \sigma E$$

Here $\epsilon$ is the permittivity, $\mu$ is the permeability, and $\sigma$ denotes the conductivity of the medium. Denoting by $\epsilon_o$ the permittivity of free space, $$\varepsilon_o = \frac{1}{36\pi} 10^{-9} F/m,$$

and by $\mu_o$ the permeability of free space, $$\mu_o = 4\pi \; 10^{-7} \; H/m,$$

we introduce the dielectric constant $\epsilon_r$ and relative permeability $\mu_r$, $$\epsilon = \epsilon_r \epsilon_o \; \mu = \mu_r \mu_o.$$

E and H obey Maxwell's time-harmonic ($e^{j\omega t}$), source-free equations:

$$\nabla \times E = -j\omega\mu \; H$$

$$\nabla \times H = j\omega\epsilon \; E.$$

Representation of Electromagnetic Field by Two Scalar (Debye) Potentials

The E-type (TM) and H-Type (TE) electromagnetic field decomposition in source-free, homogeneous, isotropic regions in spherical coordinates is expressible in terms of vector operations on scalar potentials. This has been shown in Sections 2.5 and 2.6 of the book by Felsen and Marcuvitz, cited above.

Define the longitudinal direction as the radial direction r.

Express the electric field E(r) as the sum of an E-type (TM) component E'(r) and an H-type (TE) component E"(r), and similarly for the magnetic field H(r):

$$E(r) = E'(r) + E''(r), \; H(r) = H'(r) + H''(r). \tag{1}$$

In terms of the Debye potentials $\Pi'$ and $\Pi''$, it can be shown that:

$$E'(r) = \nabla \times \nabla \times [r\Pi'(r)], \; E''(r) = -j\omega\mu \nabla \times [r\Pi''(r\Pi''(r)), \tag{2}$$

and, $$H'(r) = j\omega\epsilon \nabla \times [r\Pi'(r)], \; H''(r) = \nabla \times \nabla \times (r\Pi''(r)) \tag{3}$$

Moreover, it can be shown that $\Pi'$ and $\Pi''$ satisfy the Helmholtz equation:

$$(\nabla^2 + k^2)\Pi'(r) = 0 \tag{4}$$

and $$(\nabla^2 + k^2)\Pi''(r) = 0 \tag{5}$$

These equations, together with appropriate boundary and continuity conditions, uniquely specify the E- and H-type scalar (Debye) potentials for the electromagnetic field.

Multipole Expansion for Each Debye Potential

Figure 3:
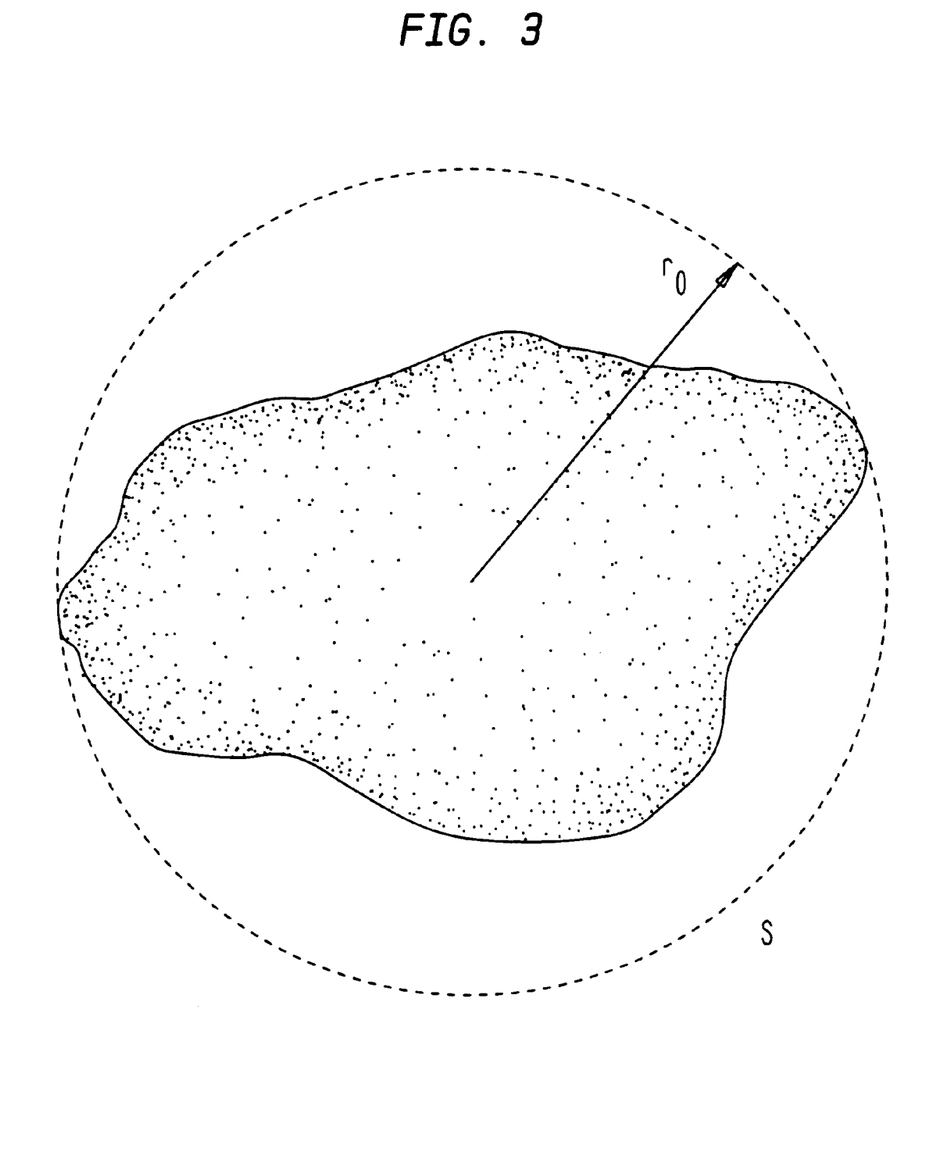
FIG. 3 depicts a body of arbitrary shape circumscribed by a bounding sphere, in accordance with the invention in one embodiment.

Consider an arbitrary structure or group of structures, composed of dielectric, conducting, permeable materials, surrounded by unbounded free space. Consider a time-harmonic ($e^{j\omega t}$) electromagnetic (EM) field that permeates the structure(s) and fills the unbounded space. Such a field could be caused by known sources inside the structure(s) that produce a radiated field, as well as by sources outside the structure(s) that produce a known incident field that scatters from the structure(s). Let S be a sphere of minimum radius $r_0$ that just circumscribes the structure(s) (FIG. 3).

The scattered and/or radiated scalar potential $\Pi$ in the free space exterior to S satisfying the scalar Helmholtz equation can be represented by the following multipole expansion in spherical coordinates r,$\theta$,$\phi$:

$$\prod = \frac{e^{-jkr}}{r} \sum_{n=0}^{\infty} \frac{F_n(\theta, \phi; k)}{r^n} \tag{6}$$

Equation (6) has the following properties:

(i) The series converges absolutely and uniformly in r, $\theta$ and $\phi$ in any region $r \geq r_0 + \epsilon > r_0$. The series may be differentiated term by term with respect to r, $\theta$ and $\phi$ any number of times and the resulting series all converge absolutely and uniformly.

(ii) The functions $F_n(\theta,\phi;k)$, n>0, may be determined from $F_0(\theta,\phi;k)$ by the two-term recursion formula $$2jknF_n = n(n-1)F_{n-1} + LF_{n-1}, \; n=1,2,\ldots,$$

where $$L = \frac{1}{\sin\theta}\frac{\partial}{\partial\theta}\left(\sin\theta\frac{\partial}{\partial\theta}\right) + \frac{1}{\sin^2\theta}\frac{\partial^2}{\partial\phi^2}$$

is the Laplace-Beltrami operator for the sphere, i.e., the angular part of the Laplacian in spherical coordinates. Therefore $\Pi$ is determined in $r>r_0$ by $F_0(\theta,\phi;k)$, where $|F_0|^2$ is the radiation pattern.

Since Eq. (6) is valid only outside a circumscribing sphere, then infinite elements based on Eq. (6) must lie completely outside a circumscribing sphere. The region between the structure(s) and the sphere must therefore be filled with finite-size EM elements.

Infinite Element For Each Debye Potential

Element Geometry

Figure 4:
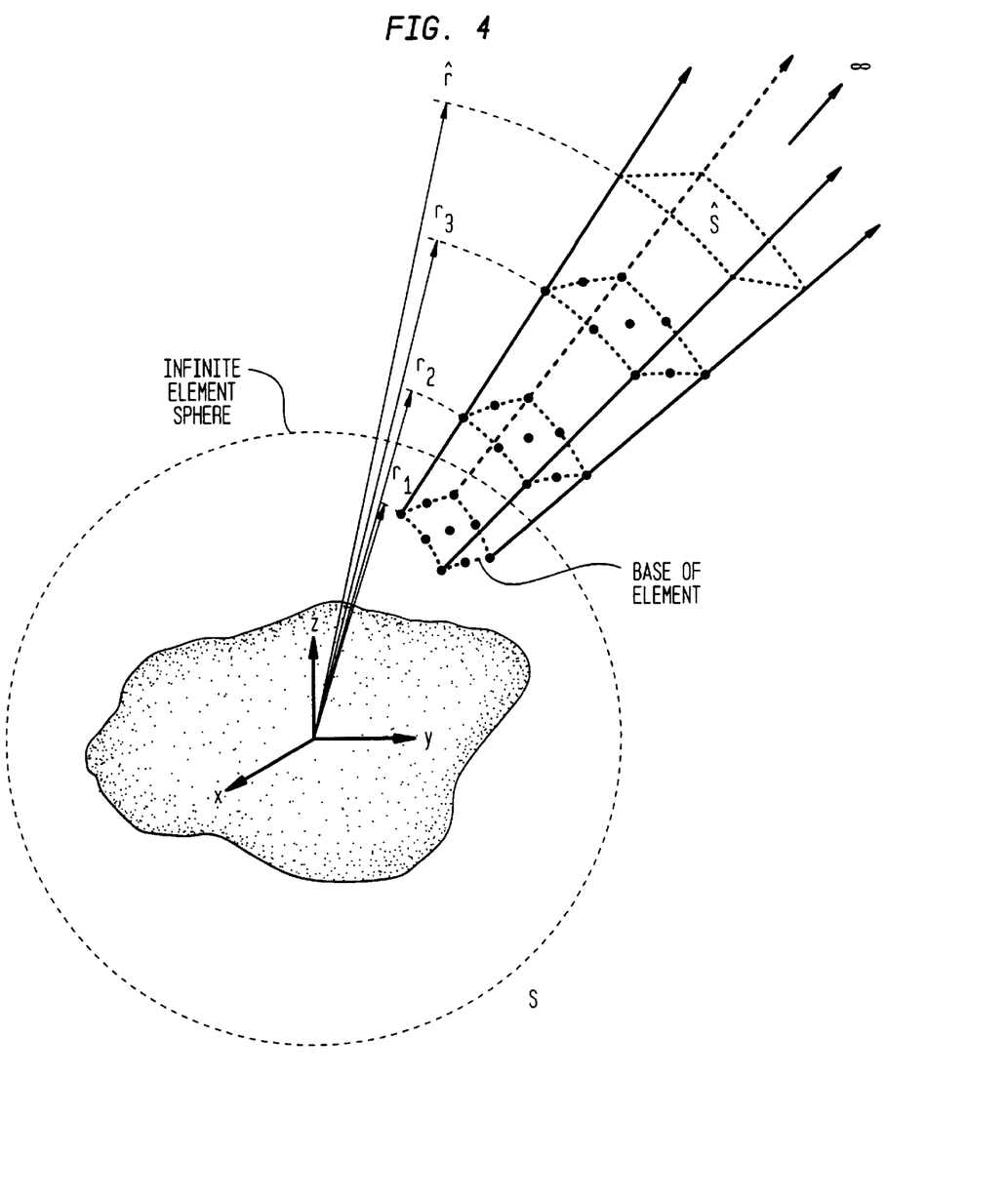
FIG. 4 depicts a spherical infinite element, in accordance with the invention in one embodiment.

A spherical infinite element is shown in FIG. 4. One face of the element, the "base", must attach to, and conform to the shape of, a sphere of radius $r_1$ surrounding the structure, called the "infinite element sphere". The base may be a curvilinear quadrilateral (as shown in the figure) or triangle; it need not conform to the $\theta,\phi$ coordinate lines (shown as dashed lines in FIG. 5). This permits one to construct a completely general 2-D mesh on the sphere, comprising curvilinear quadrilaterals and triangles of any shape and orientation. Any type of FE representation may be used over the base, e.g., Lagrange, serendipity or hierarchic polynomials of any degree. (The quadratic Lagrange nodal pattern shown here, and in later figures, is for illustrative purposes.) Thus, it will be straightforward to achieve the necessary continuity between the infinite elements and, e.g., finite elements along the spherical interface that joins the two technologies.

The side faces of the element are the loci of radial lines emanating from the sides of the base. A multipole of order m $$\left[\prod \propto \left(\frac{a_1}{r} + \cdots + \frac{a_m}{r^m}\right)e^{-jkr}\right]$$

requires m layers of nodes that are on concentric spheres of radii $r_1, r_2, \ldots, r_m$. The nodal pattern is identical on each sphere. The value m=2 corresponds to a dipole, m=3 to a quadrupole (as shown in FIG. 4), m=4 to an octupole, etc. A "variable-multipole" element contains a variable number of layers of nodes, permitting the analyst to refine the mesh radially in the infinite region by increasing the multipole order, m, analogous to p-extension for finite-size elements.

Finally, there is an outer spherical face, $\hat{S}$, at radius $\hat{r}$, that recedes to infinity in the theoretical development. Thus, in deriving the element matrix equation, the element begins with a finite size, $r_1 \leq r \leq \hat{r}$, so that the Sommerfeld radiation condition can be applied to the outer face, and then the limit is taken as $\hat{r} \to \infty$.

Figure 5:
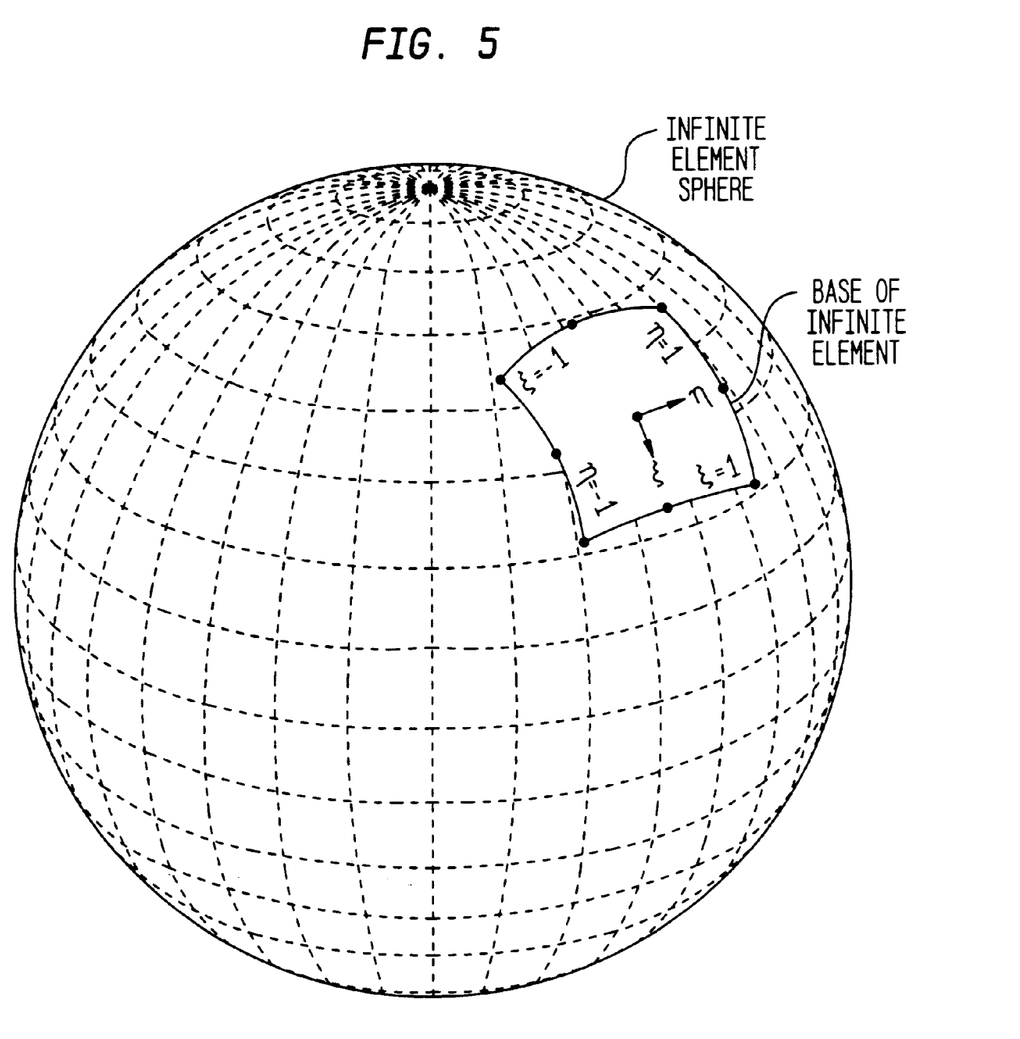
FIG. 5 depicts the base of the infinite element of FIG. 4, together with $\theta, \phi$ coordinate lines illustrative of a spherical problem geometry.

Conventional $\xi, \eta$ coordinates (illustrated in FIG. 5 for a quadrilateral) are defined over the element cross section, i.e., on spheres, by the mapping $$\theta(\xi,\eta) = \sum_{\nu=1}^{n} \theta_\nu \chi_\nu^\alpha(\xi,\eta), \quad \phi(\xi,\eta) = \sum_{\nu=1}^{n} \phi_\nu \chi_\nu^\alpha(\xi,\eta), \quad (7)$$

where n is the number of nodes in the quadrilateral or triangle, $\theta_\nu, \phi_\nu$ are the spherical angular coordinates of the $\nu^{th}$ node, and $\chi_\nu^\alpha(\xi,\eta)$ are interpolation polynomials.

Governing Physics Equations

Each Debye potential, $\Pi_i$, i=1,2 satisfies the 3-D Helmholtz equation, $$\nabla^2 \Pi + k^2 \Pi = 0 \quad (8)$$

where k is the wavenumber ($=\omega/c$), c is sound speed ($=1/\sqrt{\epsilon\mu}$), $\epsilon$ is permittivity, $\mu$ is permeability, and $\Pi$ is the complex-valued amplitude of either of the Debye potentials for a scattered and/or radiated field:

$$\prod = \begin{cases} \prod^{scat} = \prod^{total} - \prod^{inc} & \text{if scattering} \\ \prod^{rad} = \prod^{total} & \text{if radiation} \\ \prod^{scat+rad} = \prod^{total} - \prod^{inc} & \text{if both} \end{cases} \quad (9)$$

To ensure uniqueness of the solution, the potential must satisfy the Sommerfeld radiation condition at the outer "boundary" at infinity:

$$\partial \frac{\prod}{\partial r} + jk \prod = o\left(\frac{1}{r}\right), r \to \infty \quad (10)$$

where the lower case o, read "little o", means "faster than," in reference to the rate at which the expression approaches zero.

Finite Element Representation of the Debye Potential: General expression; DOF numbering The scattered and/or radiated potential is represented as follows, $$\prod(\xi,\eta,r) = \sum_{j=1}^{N} \psi_j(\xi,\eta,r) \prod_j \quad (11)$$

where $$\psi_j(\xi,\eta,r) = \psi_\nu^\alpha(\xi,\eta)\psi_\mu^r(r) \quad \nu=1,2,\ldots,n; \mu=1,2,\ldots,m; \quad n\times m=N \quad (12)$$

Here $\psi_\nu^\alpha(\xi,\eta)$ are "angular" shape functions that interpolate $\Pi$ over spherical surfaces concentric to the infinite element surface, and $\psi_\mu^r(r)$ are "radial" shape functions that interpolate $\Pi$ along radial lines. Interelement $C^0$-continuity is established by enforcing the interpolation property:

$$\psi_\nu^\alpha(\xi_{\nu'},\eta_{\nu'}) = \delta_{\nu\nu'} \quad (13)$$

$$\psi_\mu^r(r_{\mu'}) = \delta_{\mu\mu'} \quad (14)$$

Our current local node numbering convention is to begin with the nodes on the base of the element and then proceed radially outward, a layer of nodes at a time. This is summarized in Table 1, which relates the nodal (DOF) index j to the radial index $\mu$ and angular index $\nu$, where N=m×n.

Figure 6:
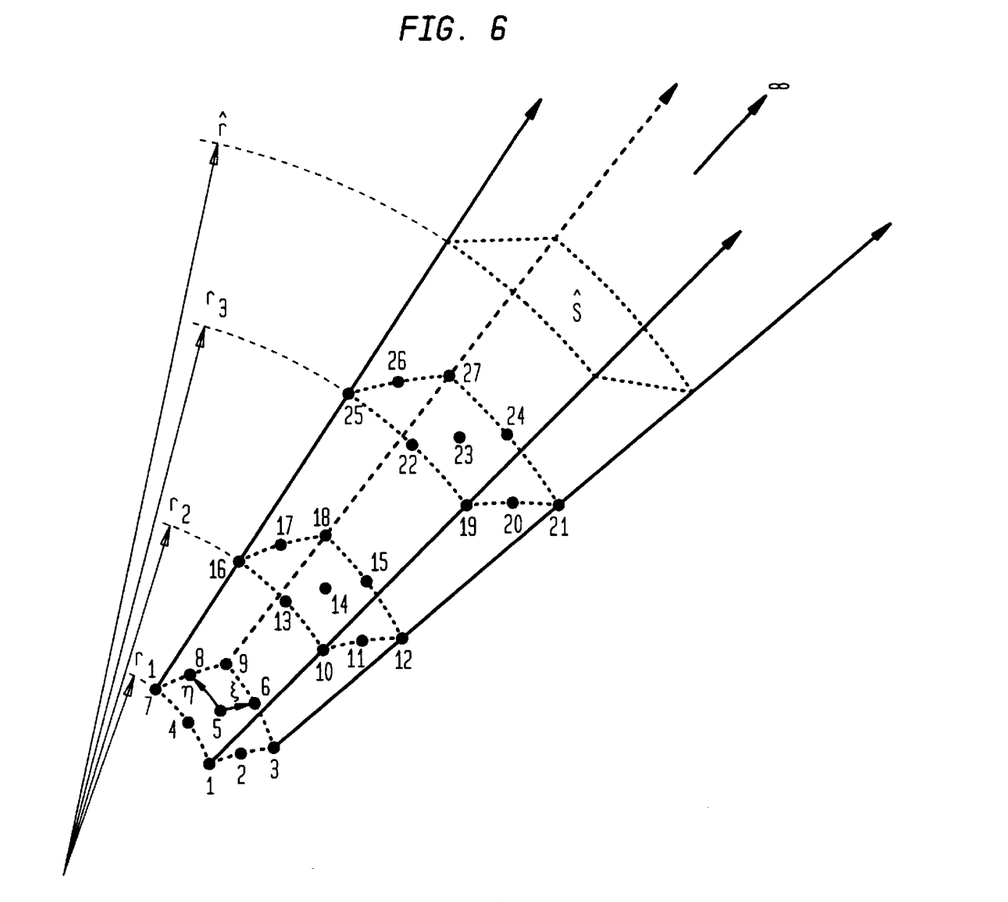
FIG. 6 illustrates a local node numbering convention for the particular case of a quadratic Lagrange quadrilateral in the angular directions and a quadrupole in the radial direction.

FIG. 6 illustrates the pattern for the particular case of a quadratic Lagrange quadrilateral (n=9) in the angular directions and a quadrupole (m=3) in the radial direction (N=m×n=27). However, it is trivial to change this pattern to any other numbering pattern.

Angular shape functions

The functions $\psi_\nu^\alpha(\xi,\eta)$ are conventional 2-D polynomials (serendipity, Lagrange or hierarchic).

For example, for the quadratic Lagrange quadrilateral elements depicted in FIGS. 4–6, the angular shape functions are $$\psi_\nu^\alpha(\xi,\eta) = \tau_\alpha(\xi)\tau_{\alpha'}(\eta) \quad \nu=1,2,\ldots,9 \ ((\alpha=1,2,3), \alpha'=1,2,3) \quad (15)$$

where $$\tau_1(u)=\tfrac{1}{2}u(u-1); \tau_2(u)=1-u^2; \tau_3(u)=\tfrac{1}{2}u(u+1) \quad (16)$$

Radial shape functons

The functions $\psi_\mu^r(r)$ use a truncated form of the radial part of the multipole expansion in Eq. (6), namely, an $m^{th}$ order multipole expansion:.

$$\psi_\mu^r(r) = e^{-jk(r-r_\mu)} \sum_{\mu'=1}^{m} \frac{h_{\mu\mu'}}{(kr)^{\mu'}} \quad \mu=1,2,\ldots m \quad (m \geq 2) \quad (17)$$

The phase factor $e^{jkr_\mu}$ does not need to be included; if omitted, it will simply appear in each $h_{\mu\mu'}$ in Eq. (18) below. The factors $k^{\mu'}$ in the denominators are also not necessary; they are included only to make the $h_{\mu\mu'}$ nondimensional. The coefficients $h_{\mu\mu'}$ are determined by the requirement of interelement $C^0$-continuity. Applying Eq. (14) to Eq. (17) yields m sets of m linear algebraic equations, [h][S]=[I], where $S_{ij}=(kr_j)^{-i}$ and [I] is the identity matrix. Therefore, $$[h]=[S]^{-1}. \quad (18)$$

This procedure defines m layers of nodes (with n nodes on each layer) lying on spheres of radii $r_1, r_2, \ldots, r_m$ (see FIG. 6).

To illustrate, consider a dipole element (m=2), $$\psi_\mu^r(r) = e^{-jk(r-r_\mu)}\left(\frac{h_{\mu 1}}{kr} + \frac{h_{\mu 2}}{(kr)^2}\right) \quad \mu = 1, 2 \qquad (19)$$

Inverting a 2×2 [S] matrix yields $$[h] = \frac{1}{r_2 - r_1}\begin{bmatrix} -kr_1^2 & k^2 r_1^2 r_2 \\ kr_2^2 & -k^2 r_1 r_2^2 \end{bmatrix} \qquad (20)$$

This procedure is the one that we have currently been using. However, a hierarchic formulation would have the usual advantages of ease of mesh refinement (by p-extension), improved numerical conditioning and elimination of all nodes exterior to the infinite element sphere. To convert to a hierarchic formulation, the angular directions would employ the standard 2-D hierarchic shape functions for quadrilaterals and triangles. The radial direction would use the mapping $\xi=1-2r_1/r$, which linearly maps the interval $1/r \in [1/r_1, 0)$ to the interval $\xi \in [-1,1)$, and then employ the standard 1-D hierarchic shape functions in $\xi$, excluding the linear function that is unity at infinity, i.e., at $\xi=1$.

Reluctivity, Permittivity, and Radiation Damping Matrices: Formal Expressions

The element matrices are derived by starting with a finite-size element, i.e., with the outer face on a sphere of radius $\hat{r}$ (See FIG. 4), and then taking the limit as $\hat{r} \to \infty$. Thus, applying the well-known Galerkin weighted residual method to Eq. (8) over a single element yields $$\lim_{\hat{r} \to \infty} \int\int\int (\nu \nabla^2 \Pi + \omega^2 \varepsilon \Pi) \psi_i dV = 0 \quad i = 1, 2, \ldots, N \qquad (21)$$

using $k^2 = \omega^2 \varepsilon/\nu$, where $\nu(=1/\mu)$ is the reluctivity, or specific reluctance. Thus, $H=\nu B$ is the inverse constitutive relation to $B=\mu H$, where B is the magnetic induction and H is the magnetic intensity.

The first integral is converted into a surface integral and another volume integral using the identity $\psi_i \nabla^2 \Pi = \nabla \cdot (\psi_i \nabla \Pi) - \nabla \psi_i \cdot \nabla \Pi$ and the divergence theorem. For the two volume integrals, substitute Eq. (11) for $\Pi$, which will create the reluctivity and permittivity matrices. The surface integral, which is over the entire boundary of the element, is split into two integrals: one over the outer face, $\hat{S}^{(e)}$, and the other over the remaining faces. For the outer face integral, substitute in the Sommerfeld radiation condition, which will create the radiation damping matrix. The second integral is zero for virtually all practical applications (see e.g., BURNETT 1994), although it is straightforward to evaluate, if necessary; it will therefore be assumed to be zero for this development.

Carrying out the above operations transforms Eq. (21) to the following element matrix equation:

$$([K]+j\omega[C]-\omega^2[M])\{\Pi\}=\{0\} \qquad (22)$$

where the reluctivity, permittivity and radiation damping matrices are, respectively, $$K_{ij} = \lim_{\hat{r} \to \infty} \int\int_{V^{(e)}}\int \nu \nabla \psi_i \cdot \nabla \psi_j dV \qquad (23)$$

$$M_{ij} = \lim_{\hat{r} \to \infty} \int\int_{V^{(e)}}\int \varepsilon \psi_i \psi_j dV$$

$$C_{ij} = \varepsilon c \lim_{\hat{r} \to \infty} \int_{S^{(e)}}\int \psi_i \psi_j dS.$$

Transformation of integrals; final expressions

The remaining mathematics transform the integrals in Eq. (23) to expressions that can be numerically evaluated. Following is a brief description of the principal steps.

Transform the integrals in Eq. (23) to spherical coordinates $r,\theta,\phi$.

The differential volume and surface elements are $dV=r^2 \sin\theta dr d\theta d\phi$ and $dS=r^2 \sin\theta d\theta d\phi$. Since the base, intermediate nodal layers, and outer face conform to concentric spheres and the side faces are the loci of radial lines, the element is a right cylinder in $r,\theta,\phi$-space (or $r,\xi,\eta$-space). Hence, the integration limits for the volume integrals can be separated into angular limits and radial limits, and the angular integration is carried out over the "spherical cross section" $\sigma^{(e)}$ of the element, i.e., any concentric spherical surface inside the element and bounded by the side faces. There is only one spherical cross section in $r,\theta,\phi$-space because the $\theta,\phi$ coordinates of the boundary of the cross section are independent of r. Hence, $\hat{S}^{(e)}$ is equivalent to $\sigma^{(e)}$ in the surface integration for $C_{ij}$.

All the 3-D integrals separate into products of 2-D "angular" integrals, $A_{\nu'\nu}^{(i)}$, and 1-D "radial" integrals, $R_{\mu'\mu}^{(i)}$. The 2-D surface integral for $C_{ij}$ separates in a similar manner.

Develop final expressions for the angular integrals.

Transform the $\theta,\phi$ coordinates to local $\xi,\eta$ coordinates using the coordinate mapping in Eq. (7). The resulting well-defined integrals can be numerically integrated using Gauss rules in the conventional FE manner. The integrals are:

$$A_{\nu'\nu}^{(1)} = \int_{\sigma^{(e)}}\int \psi_{\nu'}^\alpha \psi_\nu^\alpha \sin\theta J d\xi d\eta \qquad (24)$$

$$A_{\nu'\nu}^{(2)} = \int_{\sigma^{(e)}}\int \left(\frac{\partial \psi_{\nu'}^\alpha}{\partial \theta}\frac{\partial \psi_\nu^\alpha}{\partial \theta}\sin\theta + \frac{\partial \psi_{\nu'}^\alpha}{\partial \phi}\frac{\partial \psi_\nu^\alpha}{\partial \phi}\frac{1}{\sin\theta}\right) J d\xi d\eta$$

where $$\int_{\sigma^{(e)}}\int \cdots d\xi d\eta = \begin{cases} \int_{-1}^{1}\int_{-1}^{1} \cdots d\xi d\eta & \text{for quadrilaterals} \\ \int_{0}^{1}\int_{0}^{1-\eta} \cdots d\xi d\eta & \text{for triangles} \end{cases} \qquad (25)$$

Develop final expressions for the radial integrals.

Substitute Eq. (17) into each of the radial integrals and radial function and perform various algebraic operations. Some of the integrals become well-defined Fourier sine or cosine transforms, which can be evaluated by standard algorithms available in many mathematics software packages. The other integrals, as well as the radial function, result in undefined oscillatory terms, which are treated in the next step.

Form final expression for element matrix equation.

All the above expressions, including both the well-defined integrals and the undefined oscillatory terms, are substituted into Eq. (22), the element matrix equation, yielding:

$$[K]+j\omega[C]-\omega^2[M]=[K^\infty]-\omega^2[M^\infty]+\text{undefined oscillatory terms} \qquad (26)$$

where $[K^\infty]$ and $[M^\infty]$ comprise all the well-defined integrals.

The reluctivity and permittivity matrices consist of two types of terms: those that are independent of the location of the outer face (the "well-defined" integrals) and those that do depend on its location and therefore oscillate as the face recedes to infinity. The damping matrix, which represents application of the Sommerfeld radiation condition to the outer face, is completely oscillatory. However, we have found that the radiation condition exactly cancels the oscillatory terms in the reluctivity and permittivity matrices.

S The final form of the element matrix equation for the electromagnetic infinite element is $$([K^\infty] - \omega^2 [M^\infty])\{\Pi\} = \{0\} \quad (27)$$

where $$K_{ij}^\infty = \nu(A_{\nu'\nu}^{(1)} R_{\mu'\mu}^{(1)} + A_{\nu'\nu}^{(2)} R_{\mu'\mu}^{(2)}) \quad (28)$$

$$M_{ij}^\infty = \varepsilon r_1^2 A_{\nu'\nu}^{(1)} R_{\mu'\mu}^{(3)}$$

The angular integrals, $A_{\nu'\nu}^{(i)}$, i=1,2, are given in Eq. (24). The radial integrals are $$R_{\mu'\mu}^{(1)} = L_{\mu'\mu}\left[-\frac{j}{2}b_2 e^{-j2\zeta} + \sum_{\beta=1}^{2m} b_{\beta+2} I_\beta\right] \quad (29)$$

$$R_{\mu'\mu}^{(2)} = L_{\mu'\mu} \sum_{\beta=2}^{2m} c_\beta I_\beta$$

$$R_{\mu'\mu}^{(3)} = L_{\mu'\mu} \frac{1}{\zeta^2}\left[-\frac{j}{2}c_2 e^{-j2\zeta} + \sum_{\beta=1}^{2m-2} c_{\beta+2} I_\beta\right].$$

where $$L_{\mu'\mu} = (1/k) e^{jk(r_{\mu'} + r_\mu)} \quad (30)$$

(A factor k is introduced into the integrals (and canceled by the 1/k in $L_{\mu'\mu}$) to make them dimensionless.)

Other quantities used to evaluate Eq. (29) are defined below:

$$I_\beta = \int_{r_1}^\infty \frac{e^{-j2kr}}{(kr)^\beta} k\,dr \quad \beta \geq 1 \quad (31)$$

$$\zeta = kr_1 \quad (32)$$

$$b_\beta = \sum_{\gamma=1}^{\beta-1} a_{\mu'\gamma} a_{\mu,\beta-\gamma} \quad (33)$$

$$c_\beta = \sum_{\gamma=1}^{\beta-1} h_{\mu'\gamma} h_{\mu,\beta-\gamma} \quad (34)$$

The $h_{\mu\alpha}$ are defined by Eq. (18). Note that $h_{\mu 0} = h_{\mu,m+1} = 0$, and $h_{\mu\alpha} = 0$ for $\alpha > m$ $$a_{\mu\alpha} = -jh_{\mu\alpha} - (\alpha - 1) h_{\mu,\alpha-1} \quad \mu = 1, 2, \ldots, m \quad (35)$$

-continued $= 0$ for $\alpha > m + 1 \quad \alpha = 1, 2, \ldots, m + 1$

The radial integrals in Eq. (29) are identical for every infinite element in a mesh (because they are independent of angular variables and are along identical radial paths, i.e., radial lines emanating from the same sphere), so they only need to be evaluated once for a given problem; their computational cost is totally insignificant. Hence, the numerical integration required to generate $[K^\infty]$ and $[M^\infty]$ for each infinite element involves only the evaluation of the 2-D angular integrals, making these 3-D elements as cheap to generate as 2-D elements. In addition, since the frequency dependence of the element is contained only in the radial integrals, element generation during a frequency sweep is essentially free after the first frequency.

Combining Two Infinite Elementsfor Complete Electromagnetic Field

Eq. (27) applies to each Debye potential. The matrices $[K^\infty]$ and $[M^\infty]$ are identical for both potentials. The only difference is the vector $\{\Pi\}$ For $\Pi'$ it lists the nodal values of $\Pi'$; for $\Pi''$ it lists the nodal values of $\Pi''$. Therefore, as in standard FE practice, one combines the nodal values of $\Pi'$ and $\Pi''$ into a new vector of twice the length, the terms being ordered in any convenient fashion. The matrices $[K^\infty]$ and $[M^\infty]$ similarly double in size, with the row/column ordering of terms dictated by the ordering chosen for $[\Pi]$. This could be illustrated by modifying FIG. 6 to show two degrees of freedom at each node, one belonging to $\Pi'$ and $\Pi''$.

Coupling of Exterior Infinite Elements to Interior Finite Elements

Figure 7:
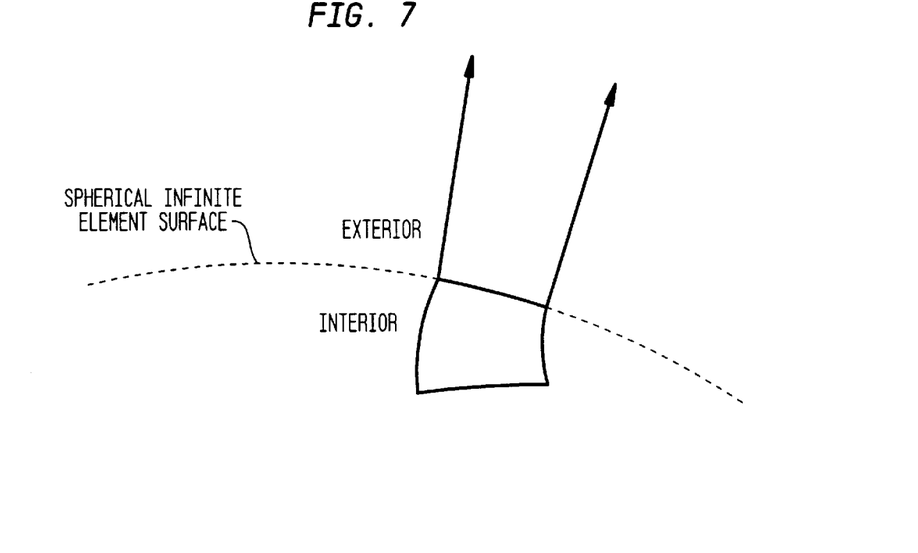
FIG. 7 depicts a portion of a bounding surface, separating the exterior and interior regions of an illustrative modeling problem. A finite element is shown within the bounding surface.

FIG. 7 shows a portion of the spherical surface separating the exterior and interior regions. Inside the surface is shown a finite element, one face of which is on the surface. In the infinite element the independent field variables are the two Debye potentials. In the finite element the independent field variables are a vector function and a scalar function. All of these fields exist on both sides of the surface. Since the surface is a mathematical construct, not an actual discontinuity, and since the constitutive properties are continuous across the surface (being the properties of free space), then all of these fields must be continuous across the surface.

The steps in the process for establishing this continuity are as follows. Consider first the interior element.

Using a Galerkin formulation and applying the divergence theorem will yield a surface integral over the boundary of the element, with the vector and scalar functions in the integrand.

Use, e.g., Eqs. (1)–(3) to relate these variables to the Debye potentials.

Substitute for the Debye potentials their finite element expansions used in the infinite elements, namely, Eq. (11). This will yield a matrix/vector product. The terms in the matrix are integrals that are known (can be computed). The terms in the vector are the nodal values of the Debye potentials. The latter, of course, are unknown. Note that the matrix equation for the interior element now also contains degrees of freedom associated with the adjacent exterior element.

Move this matrix/vector product to the "left hand side" of the element matrix equation. The matrix will be off the main diagonal because it couples the nodal degrees of freedom in the interior finite element to the nodal degrees of freedom in the exterior infinite element. This is the "coupling matrix".

This procedure could be repeated, starting with the exterior infinite element. The resulting coupling matrix will be the transpose of the one derived for the interior matrix equation, so repeating the procedure is not necessary. The pair of coupling matrices will appear symmetrically positioned on either side of the main diagonal, thus preserving symmetry in the assembled system equations, which is a manifestation of the self-adjointness of the governing partial differential equations on both sides of the spherical surface.

The invention claimed is:

1. A method for operating a digital computer, having at least one digital memory and at least one data processing element, to simulate the electromagnetic behavior of a body surrounded by a spatial region, the body having an outer surface, and the body subjected to given driving conditions, comprising:
   a) subdividing at least the spatial region into a pattern of elements, said pattern to be referred to as a mesh, and storing said mesh in the memory;
   b) for each element of the mesh, computing a set of element matrix coefficients, and storing said coefficients in the memory;
   c) assembling all of the element matrix coefficients into a system matrix, and storing the system matrix in the memory;
   d) in the data processing element, solving the system matrix equation, thereby to create a description of the values assumed within the mesh by one or more electromagnetic field variables; and
   e) recording the description in a data-storage device, wherein:
      the subdividing step comprises constructing a closed bounding surface about the body such that at least part of the spatial region, said part to be referred to as the external region, lies outside the bounding surface;
      within the external region, the one or more electromagnetic field variables comprise at least one scalar electromagnetic potential that is a Debye potential;
      the subdividing step further comprises filling the external region with elements, to be referred to as infinite elements, wherein: (i) each infinite element is bounded by a base, at least three side faces, and an outer face; (ii) each respective base lies on the bounding surface; and (iii) the outer face recedes to an infinite radius;
      the step of computing element matrix coefficients is carried out in such a manner as to satisfy the Sommerfield radiation condition; and
      the step of computing element matrix coefficients comprises applying the Helmholtz equation to an approximation of a multinole expansion of an electromagnetic field variable.

2. The method of claim 1, wherein the subdividing step further comprises:
   a) constructing a geometrical representation of the body; and
   b) subdividing the body representation into finite elements.

3. The method of claim 1, further comprising, before solving the system matrix equation, adding to said equation loads and boundary conditions subject to which the body is to be driven.

4. The method of claim 1, further comprising, after solving the system matrix equation, displaying a graphical image that conveys information resulting from the solving step.

5. The method of claim 1, wherein, within the external region, the one or more electromagnetic field variables comprise a Debye potential for a TE field component and a Debye potential for a TM field component.

6. The method of claim 1 wherein the method is carried out an electromagnetic oscillation frequency having a corresponding wavelength, and the bounding surface is constructed to have a distance of closest approach to the body of less than about one-half said wavelength.

7. The method of claim 1, wherein the bounding surface is a sphere.

8. A machine for simulating the electromagnetic behavior of a body surrounded by a spatial region, the body having an outer surface, and the body subjected to given driving conditions, comprising:
   a) means for subdividing at least the spatial region into a pattern of elements, said pattern to be referred to as a mesh;
   b) a digital memory element for storing the mesh;
   c) digital processing means for computing a set of element matrix coefficients for each element of the mesh;
   d) a digital memory element for storing the element matrix coefficients, assembled from all of the elements, as a system matrix;
   e) digital processing means for solving the system matrix, thereby to create a description of the values assumed by at least one electromagnetic field variable within the mesh; and
   f) means for recording the resulting description of the at least one electromagnetic field variable, wherein:
      the subdividing means comprise means for constructing a closed bounding surface about the body such that at least part of the spatial region, said part to be referred to as the external region, lies outside the bounding surface;
      within the external region, the one or more electromagnetic field variables comprise at least one scalar electromagnetic potential that is a Debye potential;
      the subdividing means further comprise means for filling the external region with elements, to be referred to as infinite elements, wherein: (i) each infinite element is bounded by a base, at least three side faces, and an outer face; (ii) each respective base lies on the bounding surface; and (iii) the outer face recedes to an infinite radius;
      the means for computing element matrix coefficients are constrained to satisfy the Sommerfeld radiation condition; and
      the means for computing element matrix coefficients comprise means for applying the Helmholtz equation to an approximation of a multipole expansion for an electromagnetic field variable.

9. The machine of claim 8 wherein the subdividing means further comprise:
   a) means for constructing a geometrical representation of the body; and
   b) means for subdividing the body representation into finite elements.

10. The machine of claim 8, further comprising means for displaying a graphical image that conveys information resulting from solving the system matrix.

11. The machine of claim 8, wherein, within the external region, the one or more electromagnetic field variables comprise a Debye potential for a TE field component and a Debye potential for a TM field component.

12. The machine of claim 8, wherein the simulation is to be carried out at an electromagnetic oscillation frequency having a corresponding wavelength, and the means for constructing a bounding surface are adapted to bring the bounding surface, at its closest approach, within a distance from the body that is less than one-half said wavelength.

13. The machine of claim 8, wherein the bounding surface is a sphere.

* * * * *